US006493597B1

United States Patent
Linares et al.

(10) Patent No.: US 6,493,597 B1
(45) Date of Patent: Dec. 10, 2002

(54) PRINT MONITORING SYSTEM AND METHOD USING SLAVE SIGNAL PROCESSOR/MASTER PROCESSOR ARRANGEMENT

(75) Inventors: German Linares, Bedford, NH (US); Nigel Parkin, Sevenoaks Kent, TN (US)

(73) Assignee: Inspectron, Woburn, MA (US)

( * ) Notice: Subject to any disclaimer, the term of this patent is extended or adjusted under 35 U.S.C. 154(b) by 0 days.

(21) Appl. No.: 09/016,001

(22) Filed: Jan. 30, 1998

(51) Int. Cl.⁷ .......................... G05B 15/00; G05B 19/18
(52) U.S. Cl. ................. 700/83; 700/3; 700/6; 700/17
(58) Field of Search ............... 700/223, 75, 3, 700/17, 83, 6; 324/667, 668, 669, 311; 209/603; 270/58, 52, 53, 54, 55; 271/256, 259, 53, 493; 348/571; 707/500

(56) References Cited

U.S. PATENT DOCUMENTS

| | | | |
|---|---|---|---|
| 3,648,032 A | * 3/1972 | Ginests | 700/75 |
| 4,133,008 A | * 1/1979 | Tisue | 358/446 |
| 4,408,231 A | * 10/1983 | Bushaw et al. | 358/406 |
| 4,524,394 A | * 6/1985 | Nagashima | 358/296 |
| 5,067,088 A | 11/1991 | Schneiderhan | 700/221 |
| 5,131,057 A | * 7/1992 | Walowit et al. | 382/264 |
| 5,153,748 A | * 10/1992 | Moyer | 358/443 |
| 5,182,721 A | * 1/1993 | Kipphan et al. | 382/112 |
| 5,274,713 A | * 12/1993 | Chang et al. | 382/141 |
| 5,276,628 A | 1/1994 | Schneiderhan | 700/223 |
| 5,278,674 A | * 1/1994 | Webb et al. | 358/475 |
| 5,524,223 A | * 6/1996 | Lazaravich et al. | 712/241 |
| 5,710,721 A | * 1/1998 | Rieckhoff et al. | 714/51 |
| 5,805,236 A | * 9/1998 | Roth | 348/571 |
| 5,808,295 A | * 9/1998 | Takeda et al. | 250/216 |
| 5,818,033 A | * 10/1998 | Takeda et al. | 250/208.1 |
| 5,953,065 A | * 9/1999 | Cahill, III | 348/478 |
| 5,959,740 A | * 9/1999 | Takeda et al. | 358/296 |

FOREIGN PATENT DOCUMENTS

EP          0772145 A2    11/1996

* cited by examiner

Primary Examiner—Paul P. Gordon
(74) Attorney, Agent, or Firm—Lahive & Cockfield, LLP

(57) ABSTRACT

A print monitoring system is disclosed using combination of analog signal processing circuits and signal processors on the slave processing boards to avoid the need for analog-to-digital converters and dedicated frame buffers between the slave processor and the video capture device. Additionally, the division of labor between the slave processors and the master processor is configured such that the slave processors perform a larger portion of the data manipulation, data analysis for the captured images. The master processor can be simply used to collect the decoded data and/or data analysis results from the slave processors and to run the interface to the operator to communicate the data/results. Finally, a graphical user interface between the user and the master processor is used to facilitate the calibration of the system and specifically the images captured by each of the video cameras.

14 Claims, 9 Drawing Sheets

PRINT MONITORING SYSTEM AND METHOD USING SLAVE SIGNAL PROCESSOR/MASTER PROCESSOR ARRANGEMENT

BACKGROUND OF THE INVENTION

Print monitoring systems are commonly used to monitor printed matter in some types of paper/sheet handling systems and to make certain control decisions based upon the character of the printed matter. The following is a list of a few common applications:

1. Print quality monitoring: The monitoring system detects the precision with which the printing system has formed the printed matter and/or the consistency with which the matter is printed across the entire paper. For example, in a laser printing system, the monitoring systems detect a low-toner situations where the contrast of the printed matter has degraded unacceptably.
2. Digit control: Overnight package delivery systems, for example, typically use a preprinted multi-layered shipping receipt that is filled out by the customer; the customer keeps one receipt, the package recipient receives a receipt with the package, and then typically, a few receipts are retained for the carrier's records. Such receipt systems are typically printed with a package tracking number that is represented as an alpha-numeric sequence on the customer's and recipient's copies and encoded in a universal product code (UPC) or bar code symbol on at least one of the carrier's receipts. The carrier's package tracking system is based upon the presumption that the package tracking numbers are the same for each layer of the receipt. In such situations, print monitoring systems ensure that package tracking numbers of each layer match during assembly of the receipt.
3. Sequence control: When mailing personalized advertisement materials and in all cases when mailing bills, it is necessary to ensure that all pages of the mailing insert are combined into the proper envelope. This is especially important in the case of confidential information, such as credit card or phone bills. Even if sheet transfer and handling error rates are low, the risk that a wrong bill will be sent to a customer is unacceptable thus requiring checking each page and the envelope prior to insertion.

While a number of different configurations exist, many print monitoring systems use a multi-slave processor/master processor configuration. The slave processors are used to receive image data from some type of image capturing device such as a line-scan camera or frame capture camera. The detected image is buffered by the slave processor for transmission to the master processor, which executes an optical character recognition (OCR) or one or two dimensional UPC symbol decoding algorithm.

SUMMARY OF THE INVENTION

Problems exist, however, with known print monitoring systems. Generally, they tend to be expensive to manufacture from the standpoint of part counts/components. This is especially true for the slave processor boards, which must be replicated for each image capture device. Additionally, existing systems also tend to have poor scalability. Each slave processor requires substantial attention and control from the master processor, thus restricting the number of additional slave processors that can be added onto or supported by a given master processor. This factor additionally contributes to the limited ability of these systems to compare the data received from the slave processors with other sources without overloading the ability of the master processor to manage the data in real-time.

The print monitoring system of the present invention implements a number of improvements that overcome the above-described problems with the prior art. The innovations can be classified into separate groups. First, a combination of an analog signal processing circuit and signal processor is used on the slave processing boards to avoid the need for analog-to-digital converters and dedicated frame buffers between the slave processor and the video capture device. Secondly, the division of labor between the slave processors and the master processor is configured such that the slave processors perform a larger portion of the data manipulation, data analysis for the captured images. The master processor can be simply used to collect the decoded data and/or data analysis results from the slave processors and to run the interface to the operator to communicate the data/results. Finally, a graphical user interface between the user and the master processor is used to facilitate the calibration of the system and specifically the images captured by each of the video cameras.

In general, according to one aspect, the invention features the print monitoring system for scanning and processing printing matter. The system comprises an image capturing device that generates an electrical analog video signal representative of scanned areas of the printed matter. A processor receives the analog video signal at a digital signal port and internally stores the video signals for digital signal processing. In order to enable this direct sampling, an analog preprocessing stage is utilized between the processor and the image capturing device that level adjusts the analog video signal to enable receipt at the digital signal port.

In specific embodiments, the processing stage thresholds the analog video signal prior to receipt at the digital signal port with the processor preferably setting the threshold. The preprocessing stage also comprises an illumination compensation circuit that compensates for uneven illumination of the printed matter. This functionality is achieved by low pass filtering the signal from the image capturing device, preferably using an asymmetric filter.

In the preferred embodiment, the processor is a digital signal processor and the digital signal port is its serial port. The processor preferably has an internal data memory that serves as a frame buffer for the video data from the image capturing device. In specific embodiments, the image capturing device can be a line scan camera, an array camera, asynchronous reset camera, or a progressive scan camera.

In general, according to another aspect, the invention features a print monitoring system. The system comprises at least one image capturing and processing subsystem having at least one image capturing device that generates video signals representative of printed matter and a slave processor that processes and analyzes and/or decodes the video signals. A master processor downloads image decoding and/or image analysis criteria to the slave processor in the subsystems and receives the decoded data and/or analysis data from the slave processor for presentation to an operator.

In general, according to still another aspect, the invention features a user interface for a print monitoring system. The interface displays an image captured by a camera of the system and then enables adjustment of a size and location of a decoding field within the captured image. In this way, the portion of the image in which the character recognition algorithm, for example, is used can be controlled in software, avoiding the need for manual measurements under the camera.

In general, according to still another aspect, the invention features a user interface for a print monitoring system. It displays a template character taught to the system and enables modification of the shape of the template character. In this way, model characters presented to the system either through a learning sequence or directly programmed can be modified to improve the accuracy of the character recognition algorithm.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, like reference characters refer to the same parts throughout the different views. The drawings are not necessarily to scale, emphasis instead being placed upon illustrating the principles of the invention. Of the drawings.

DETAILED DESCRIPTION OF THE INVENTION

Figure 1:
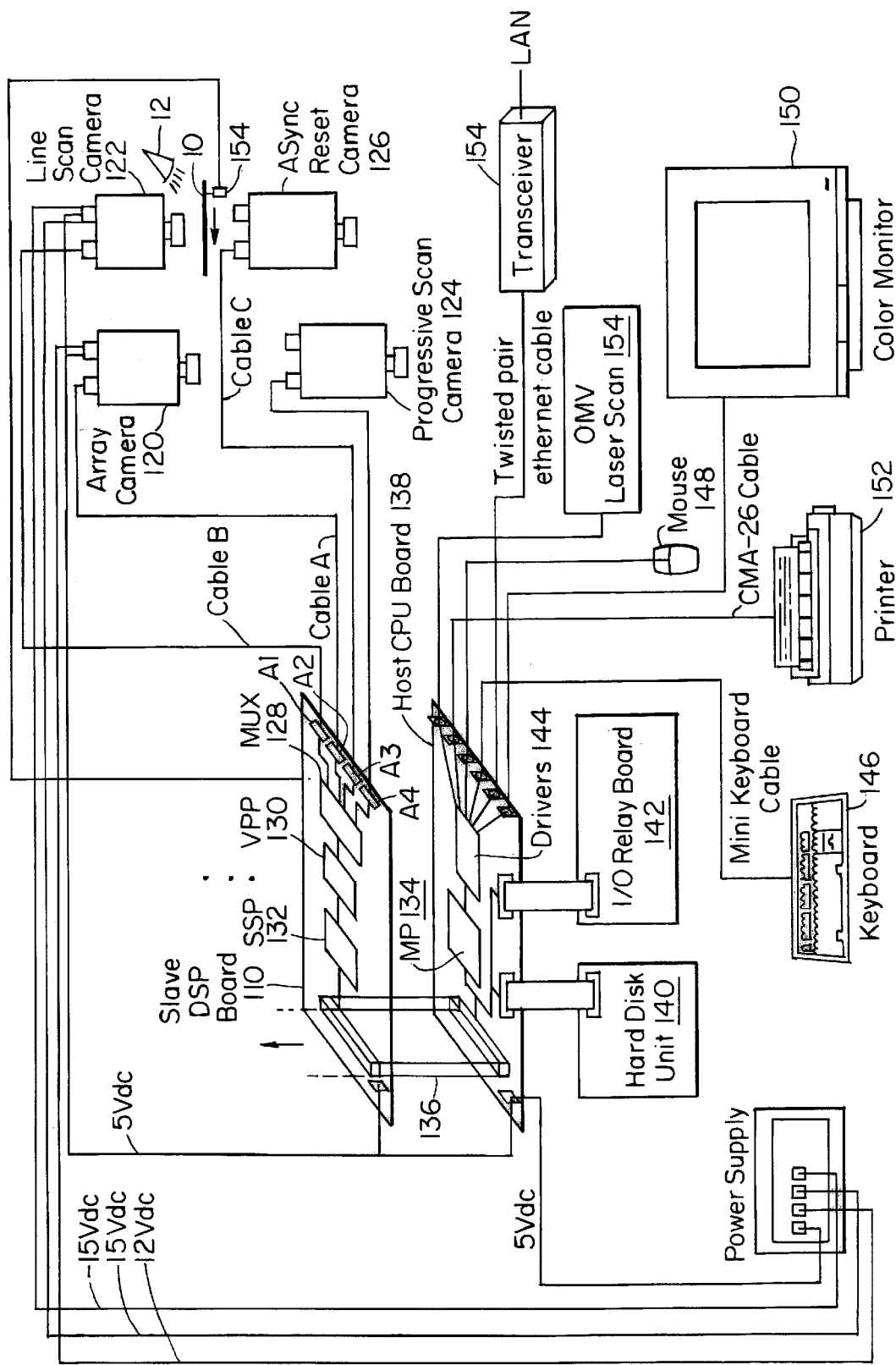
FIG. 1 is a schematic block diagram of a print monitoring system according to the present invention.
Figure 2A:
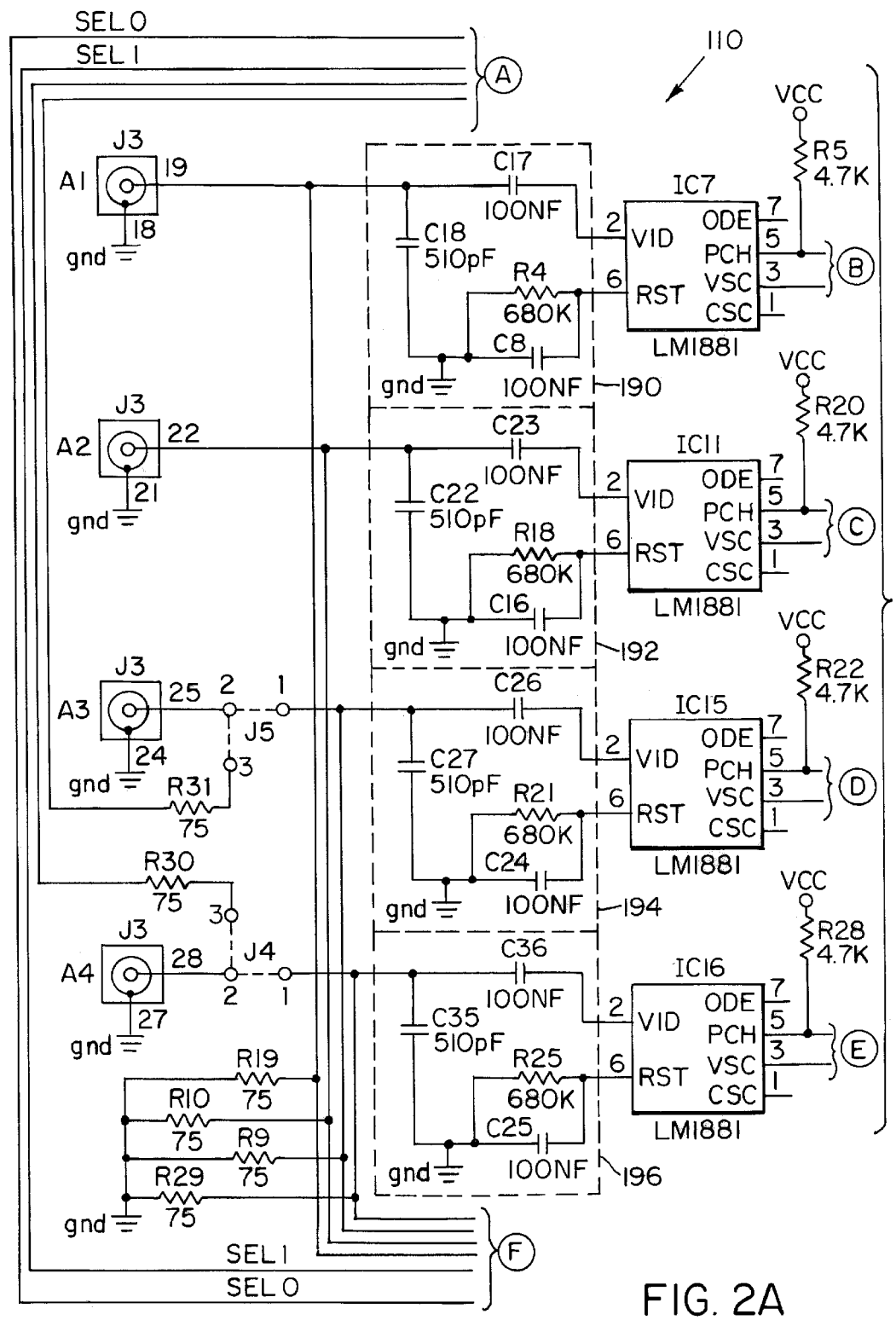
FIGS. 2A–2D are circuit diagram of the slave digital signal process board.
Figure 2B:
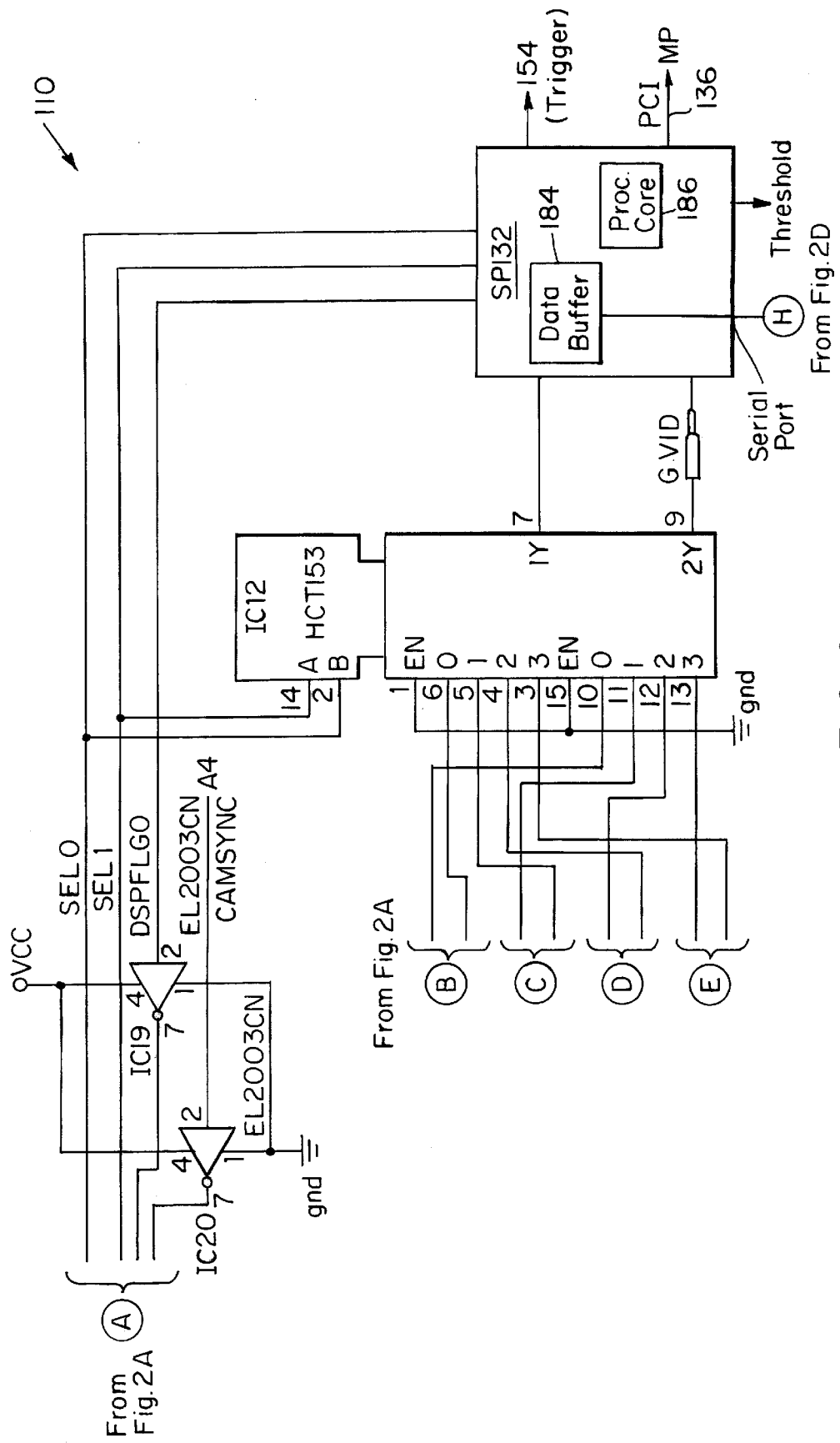
Figure 2C:
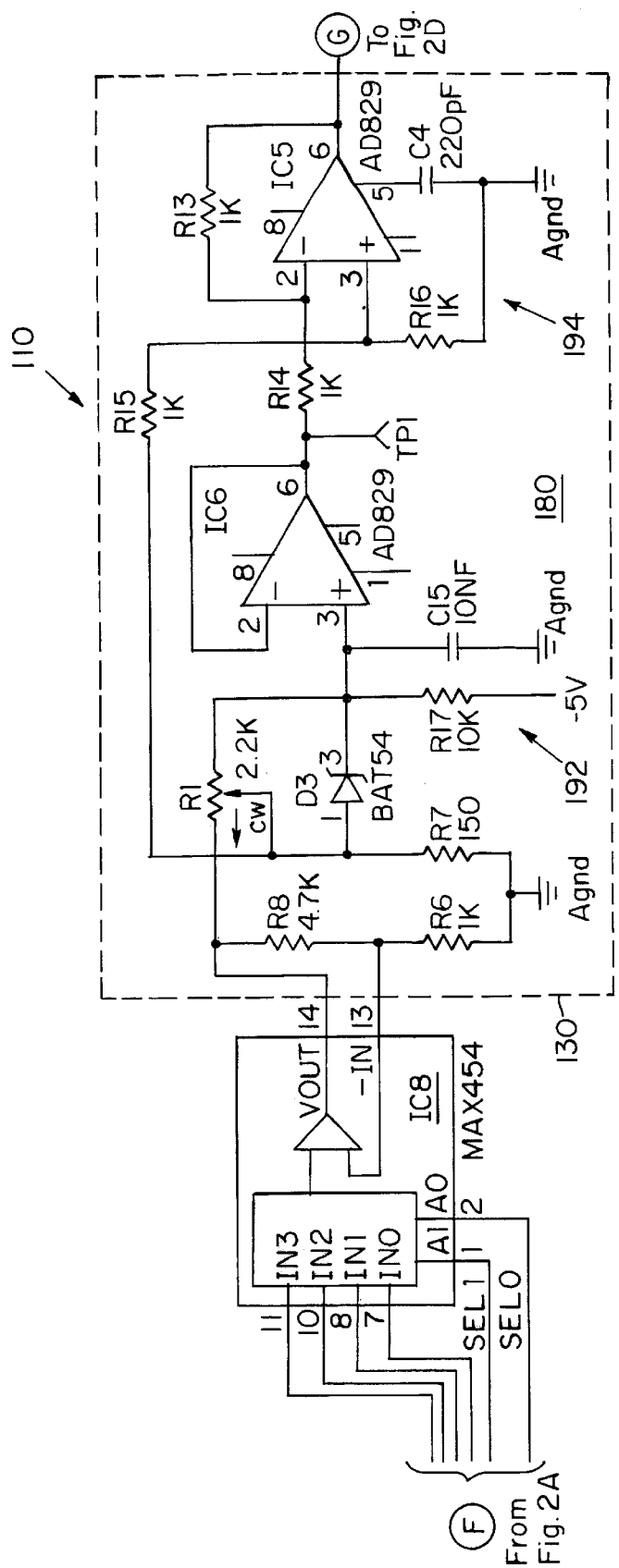
Figure 2D:
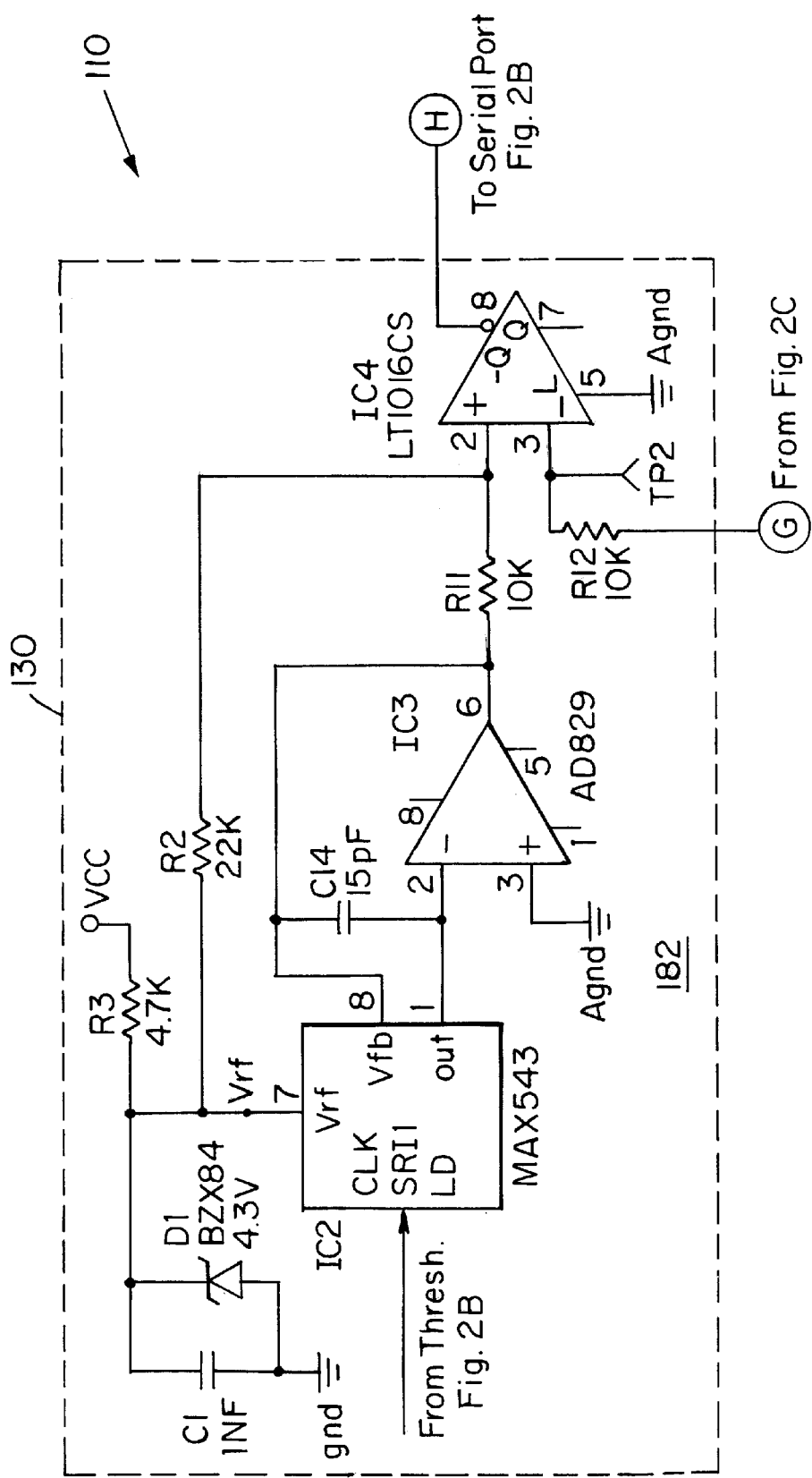

FIG. 1 is a schematic block diagram illustrating the general organization of the print monitoring system, which has been constructed according to the principles of the present invention.

In the preferred embodiment, each slave processor (DSP) board 110 has multiple, four for example, video input ports A1, A2, A3, A4. Each video signal port A1–A4 has the capability to support its own video capture device. As illustrated, potential video capture devices include array cameras 120, line camera 122, progressive scan cameras 124, and asynchronous reset cameras 126.

In order to time image acquisitions by the cameras, trigger device 154 is used to detect the movement of the printed matter 10. The trigger device 154 takes a number of different configurations depending on the application and the event to be detected. In one case, it detects the beginning of a sheet of paper using an optical or probe sensor. The signal processor 132 then times a delay until the symbols of interest are under the camera before signaling the beginning of an image capture event. In other cases, the trigger device 154 is used to detect symbols on the printed matter such as lines at predetermined intervals or movements of the paper handling equipment using optical or mechanical encoders, for example.

On the slave board 110, an analog multiplexor 128 is used to select the video signal from one of the video input ports A1–A4. The selected video signal is presented to a video preprocessor 130 that converts the video signal into a form that is capable of being sampled at a digital signal port of a digital signal processor 132. Specifically, the video preprocessor 130 low pass filters the video signal to compensate for any uneven illumination at the video capture device 120–126 by printed matter illuminator 12 and level adjusts the video signal by thresholding it to a signal level appropriate for receipt at the signal processor's digital signal port.

The signal processor 132 identifies the target symbols in the captured video signal, feature matching. The symbols can be alpha or numeric characters. One/two-dimensional UPC bar codes, and/or PostNet codes, for example, depending on the application are decoded based on multiple samples of bar measurements and then decoded based on the specific bar code type. Detected alpha-numeric characters are identified using an OCR algorithm executed by the signal processor. In the case of symbols, the signal processor decodes the two dimensional UPC bar codes, for example.

The template characters for the OCR algorithm are acquired one of two ways. The system can be taught by presenting characters in the relevant font to the image capture device during a teach mode. Alternatively, font data can be downloaded from the host CPU board 138.

The data identifying the characters/probability of match or data encoded in the bar code symbols are then uploaded to the host central processing unit (CPU) board to master processor 134 via a bus 136, preferably AT or PCI type.

As suggested by the FIG. 1, additional slave DSP boards 110 can be attached to the ISA bus 136. For example, in one implementation, up to four separate slave DSP boards 110 are connected to the host central processing unit (CPU) board 138 via extensions to the bus 136.

In the preferred embodiment, the master processor 134 is an Intel-brand 80586 industrial-grade CPU. It connects to a hard disk unit 140, input/output (I/O) relay board 142, and memory via bus 136. In the preferred embodiment, through its drivers 144, it receives user commands from a keyboard 146 and mouse 148. It presents data to the operator via color monitor 150 and printer 152. In a preferred implementation, the monitor 150 preferably has a touch screen to enable operator control without the necessity for the keyboard 146 and mouse 148. In the preferred embodiment, the system also has a network interface card (NIC) 154 connecting the CPU board 138 to a local area network (LAN) to enable remote control, monitoring, and data logging.

Since the master processor 134 is not burdened with image processing, this being performed by the slave processors 132, the host CPU board 138 has the capability to receive print monitoring data via its digital input ports, such as the serial port. The data is generated by a laser bar code scanner and/or optical/magnetic reader 154. This provides the ability to acquire additional data directly by the CPU 134 in addition to that received through the slave DSP boards 110.

FIG. 2 is a circuit diagram of a slave DSP board 110 of the present invention.

Video signals from up to four image capture devices are received at video ports boards A1–A4, respectively. Four bandpass filters 190, 192, 194, 196 filter the respective video signals to isolate video synchronization signals from the cameras, such as vertical blanking periods associated with the end of frames/fields or horizontal synchronization pulses associated with the end of a scan line. Four video reset controllers IC7, IC11, IC15, IC16 detect the video synchronization signals and pass them to the signal processor 132 through digital multiplexer/selector IC12. Select lines SEL1, SEL0 from the signal processor 132 control multiplexer IC12 to select a single input for monitoring for the synchronization signals.

An analog multiplexor IC8 is used to select one of the video signals from the video ports based on select lines SEL1, SEL0. The selected video signal is presented to video preprocessor 130.

In the preferred embodiment, the video preprocessor 130 is a two stage video preprocessor. The first stage is an illumination compensation circuit 180 that compensates for uneven illumination of the printed matter 10 at the cameras 120–126. The second stage is a thresholding circuit that level adjusts the video signal from the illumination compensation circuit 180 according to a threshold set by the signal processor 132.

In more detail, the illumination compensation circuit 180 comprises a spectral filter 192 and subtractor 194. The filter 192 functions is an asymmetric low pass filter that responds slowly to falling edges, white-to-black transitions, but quickly to rising edges, black-to-white transitions. This functionality serves to derive a background level that is subtracted from the video signal from multiplexor IC8. Specifically, the inverting input of amplifier IC6 is connected in a voltage follower configuration. Capacitor C15 at the non-inverting terminal is charged quickly by rising edges through forward-biased zener diode D3. The charge may only then slowly leak-off through resistor R1. The resistance of resistor R1, adjustable either in software or manually, sets the time constant for this filter. Generally, the filter's time constant is based on the one-line scanning frequency of the camera. In this way, it can low pass filter any background variation in levels over a single scan line.

The signal indicative of the background level produced by amplifier IC6 is presented to subtractor 194 and specifically to inverting input of a second amplifier IC5 to subtract off the background signal from the video signal received at its non-inverting input.

Figure 3A:
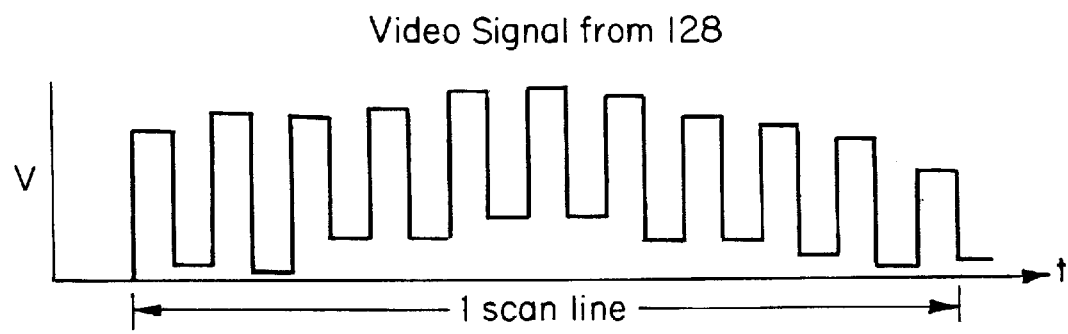
FIGS. 3A–3C are voltage versus time plots illustrating the operation of the illumination compensation circuit.
Figure 3B:
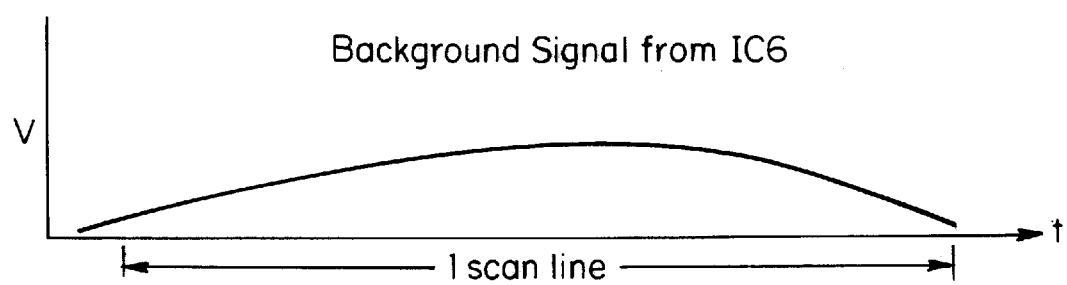
Figure 3C:
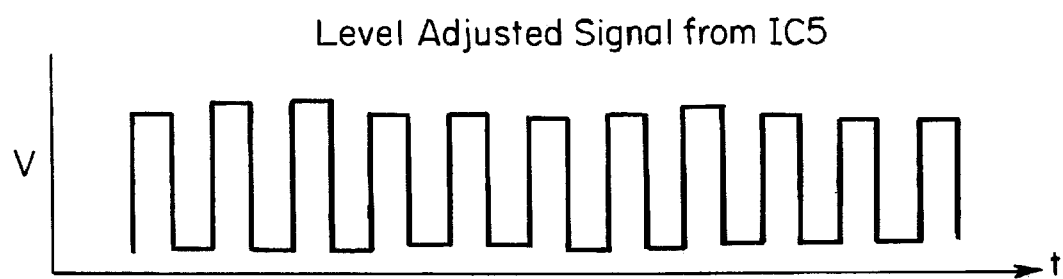

FIGS. 3A–3C illustrate the operation of the asymmetric illumination compensation circuit 180. An exemplary video signal from multiplexor IC8 is shown in FIG. 3A. Exemplary video signal could be generated by a series of alternating back and white pixels set at even spacings. As illustrated, since the illumination tends to be better in the middle of the scan line where the light from the illuminator 12 is the strongest, the background or average level of the video signal 128 tends to increase in the center of a scan line. As shown in FIG. 3B, the background signal generated by IC6 is indicative of this center-scan line increase in illumination. As a result, when this background signal in FIG. 3B is subtracted from the video signal in FIG. 3A, a compensated output as shown in FIG. 3C is generated by IC5.

Returning to FIG. 2, the video signal is next compared to a quasi-static threshold in thresholding circuit 182. Specifically, the signal processor generates control signal to programmable reference voltage generator IC2. The generator provides a threshold signal based on reference voltage VRF. The reference voltage VRF is generated by zener diode D1 and resistor R3. This threshold signal is presented to amplifier IC4 at the non-inverting input. The level adjusted signal from the subtracting circuit 194 is presented to the inverting input of amplifier IC4.

The result of the thresholding circuit 182 is a signal that is a high logic level when the video signal is above the level set by the thresholding signal and a logic low level when below the set level. Thus, only the transitions in the video signal that pass through the threshold voltage are maintained in the signal presented to the signal processor 132.

The signal processor 132 uses the trigger signal from trigger device 154 to find the location of the printed matter of interest. Then the processor 132 treats the video signal as a synchronous serial stream. Specifically, the video signal is received at the signal processor's synchronous serial port. The digital signal processor uses the line pulse from digital multiplexer IC12 to indicate the start of the line data stream. The line start pulse (horizontal sync pulse) makes the signal processor 132 serial port sample the binary video stream at the serial clock frequency.

A software defined number of words are digitized before the signal processor 132 stops sampling and waits for the next line signal. The words are automatically stored as consecutive words in the data buffer 184 that is integrated on the signal processor 132.

The serial clock frequency is either generated by the signal processor 132 internally or fed to the processor from the pixel clock output of the image capturing device or associated circuitry. According to this method, the video is transferred in a bit-packed black and white image to the signal processor 132 memory using no frame grabbing hardware and minimal software processor load.

In the preferred embodiment, processor 132 is a signal processor 132. Many signal processors, as in the preferred embodiment, have the ability to automatically store the consecutive words in the buffer memory 184 without intervention from the processing core 186, which can consequently begin processing the data as it is received. In the preferred embodiment, the signal processor 132 is an Analog Devices 2181 signal processor with 32K of internal data RAM.

Figure 4A:
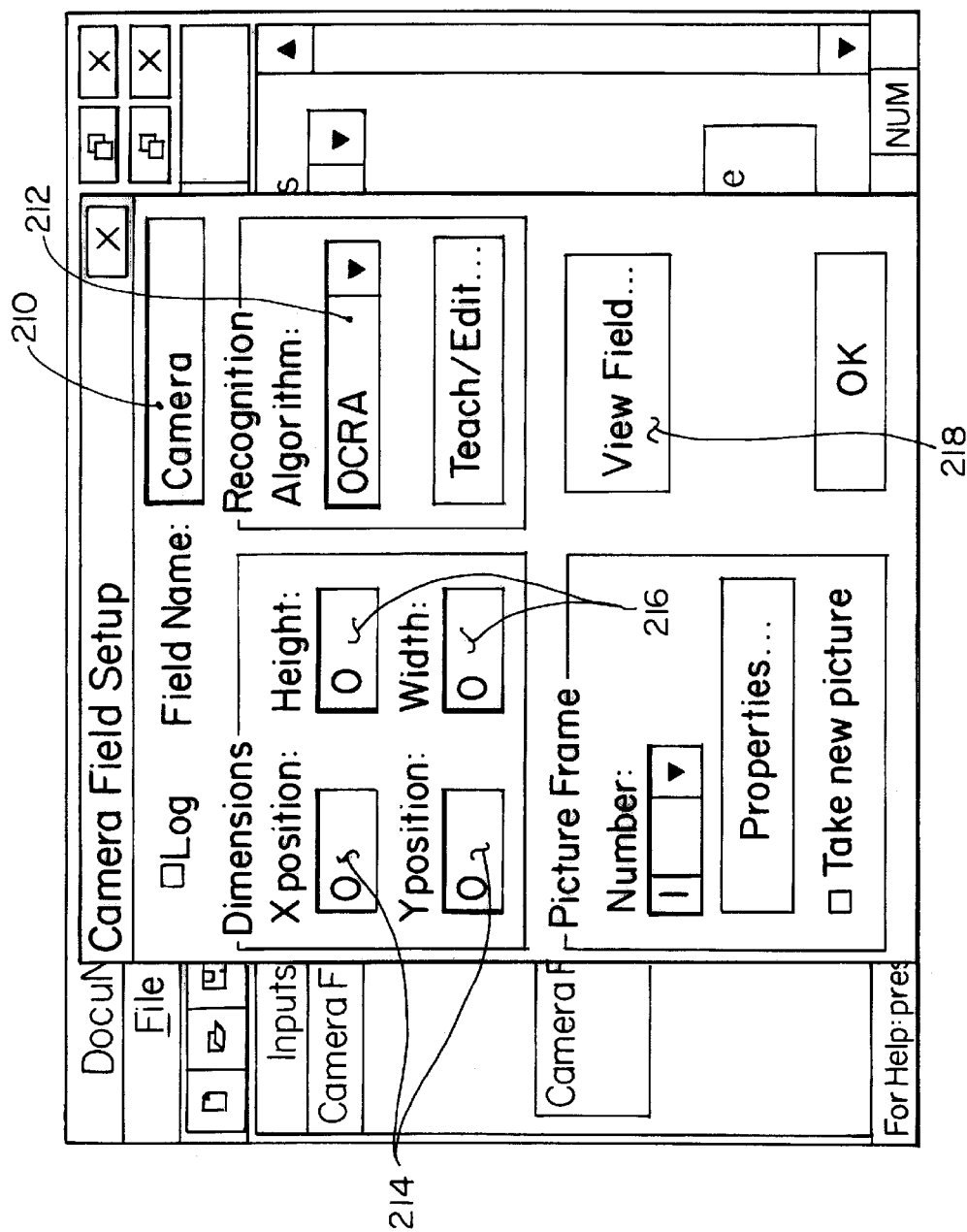
FIGS. 4A, 4B, and 5 show dialog boxes of the graphical user interface of the inventive system.
Figure 4B:
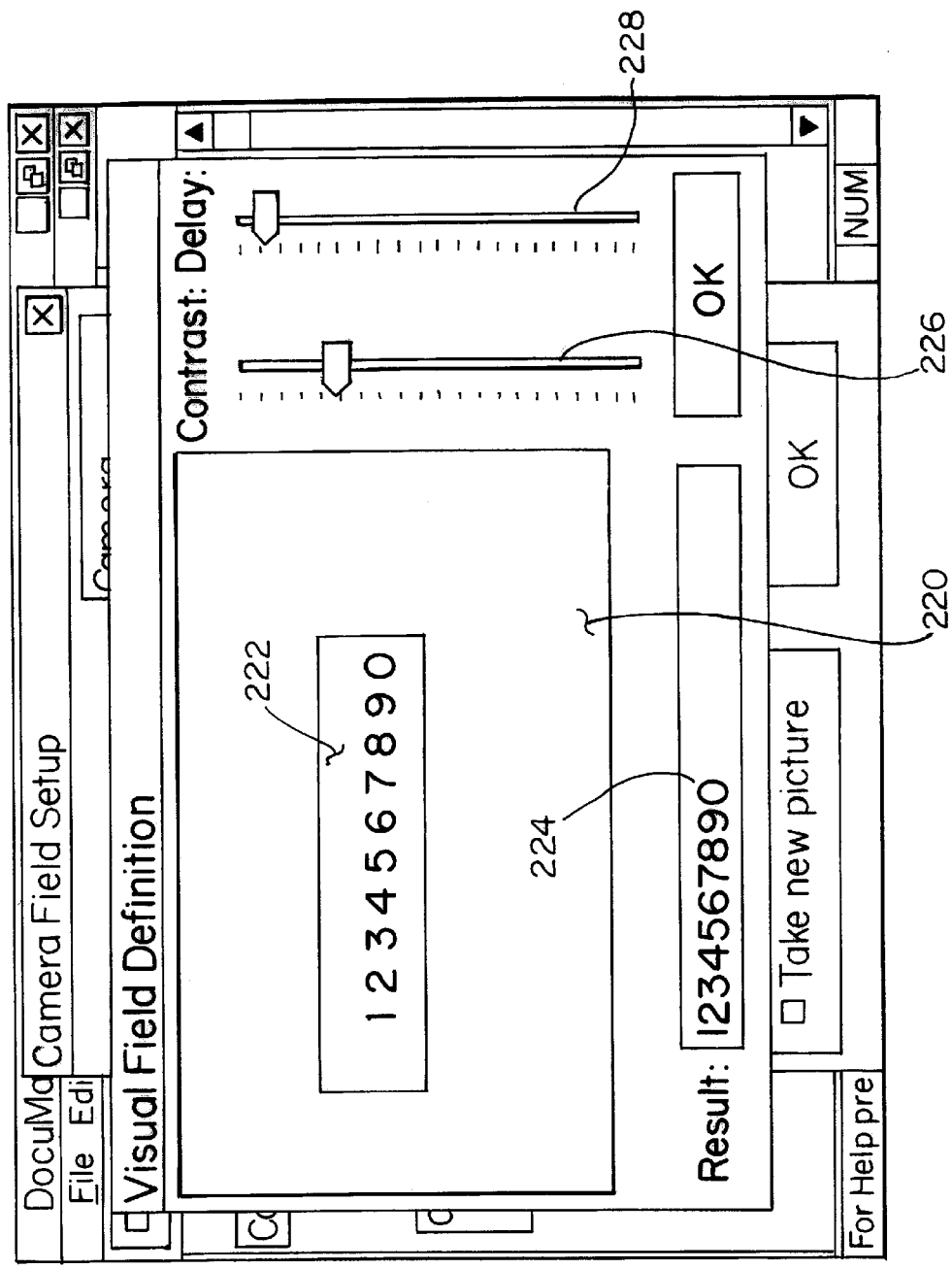
Figure 5:
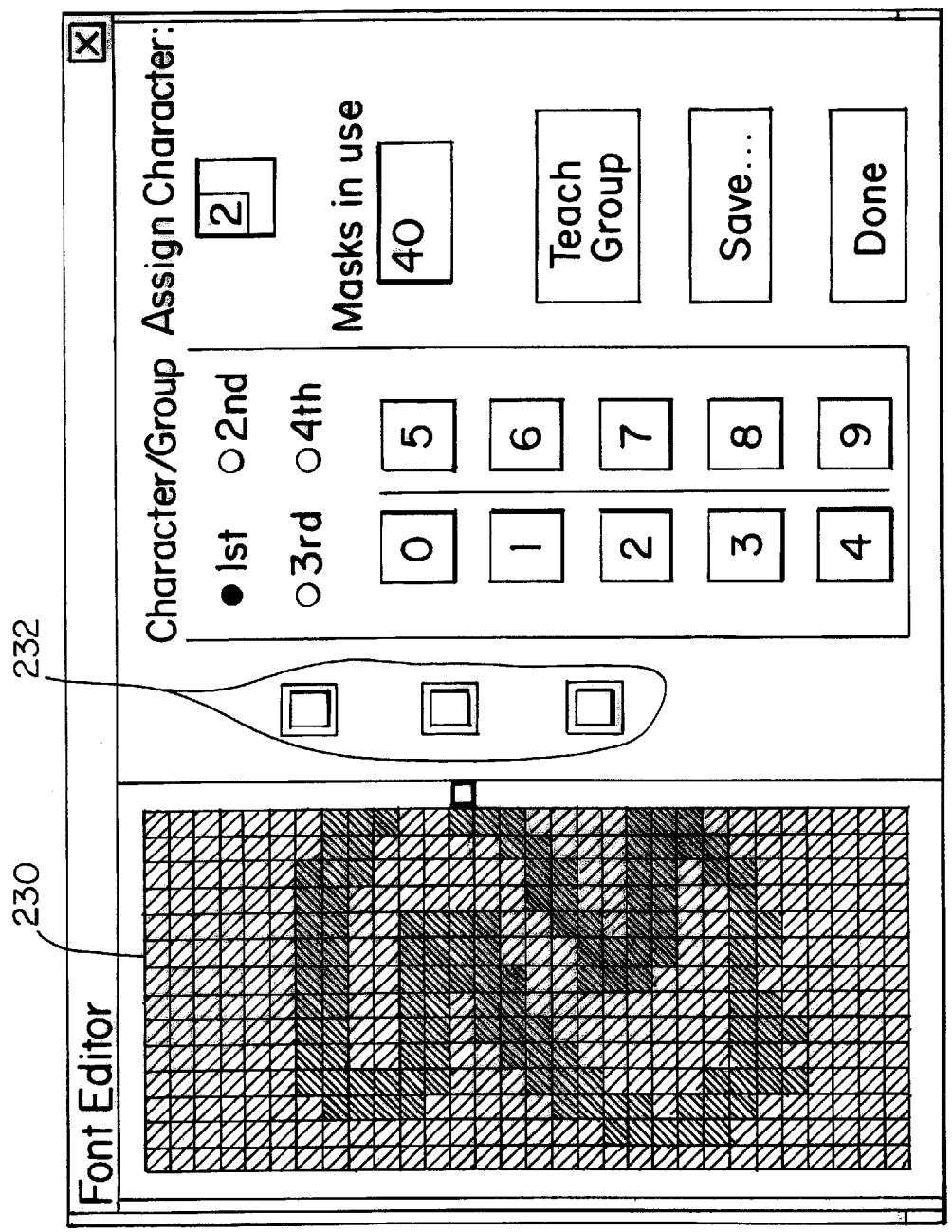

FIGS. 4A, 4B, and 5 illustrate the graphical user interface (GUI) generated by host CPU board 134 and displayed on monitor 150 that enables an operator to adjust camera field position and size and font characters in software.

FIG. 4A is dialog box of the GUI. Field name input area 210 identifies the camera connected to the slave DSP boards 110. Recognition algorithm data area 212 identifies the decoding being performed on the captured images. X and Y position data areas 214 accept user data entry to select the position of the field, in the camera's larger total captured image, in which the recognition algorithm will be applied. The height and width data areas 216 enable user selection of the size of the field. In short, the user enters position and size information in data areas 214, 216 to define the field in the captured image from the camera in which the recognition algorithm is used.

FIG. 4B shows the dialog box that is generated when view field 218 is selected. Reference 220 identifies the entire captured image from the selected camera, the image 220 being downloaded by the signal processor 132 controlling the camera. Box 222 identifies the decoding field defined by data areas 214, 216 in which the recognition algorithm is applied. Data display area 224 presents the results of the recognition algorithm.

The ability to locate and size the decoding field in software provides a number of Additionally, in the view field dialog box contrast and delay are adjustable. Specifically, delay adjustment 228 defines the delay after receipt of the trigger signals from trigger device 154 when image capture begins. Contrast sets the threshold applied by thresholding circuit 182 in the preprocessor 130.

FIG. 5 shows a font editor of the GUI. This function enables learned fonts to be modified manually. Specifically, display area 230 presents a learned character input through the camera and stored in the signal processor. Artifacts associated with the image capture can be contained in this model character. These are manually removed by the user by selecting one of the three intensities in palette 232 and then modifying the appropriate areas with the cursor 234.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A print monitoring system, comprising:
    at least one image capturing and processing subsystem, including:
        at least one image capturing device that generates video signals representative of printed matter, and
        a slave processor that processes and analyzes and/or decodes the video signals; and
    a master processor that downloads image decoding and/or image analysis criteria to the slave processor in the subsystems and that receives the decoded data and/or analysis data from the slave processor for presentation to an operator.

2. A print monitoring system as described in claim 1, wherein the slave processor forwards images represented by the video signals to the master processor for presentation to an operator.

3. A print monitoring system as described in claim 1, wherein the slave processor stores character font data and analyzes the video signals by performing optical character recognition operations using the character font data.

4. A print monitoring system as described in claim 3, wherein the character font data is generated by the slave processor after presenting example characters to the image capturing device.

5. A print monitoring system as described in claim 3, wherein the character font data is downloaded from the master processor.

6. A user interface for a print monitoring system, comprising:
    a user interface element identifying a decoding field, said decoding field signifying a first portion of a printed document to be analyzed;
    a representation of a second portion of said printed document neighboring said first portion, such that said first portion and said second portion are displayed in said user interface.

7. The user interface of claim 6, further comprising a data display area for displaying a result of an analysis of said first portion of said printed document.

8. The user interface of claim 6, further comprising a contrast control for adjusting a contrast parameter of an analysis of said first portion of said printed document.

9. The user interface of claim 6, further comprising a delay control for defining a delay after receipt of a trigger signal representing a start of image capture of said printed document.

10. A user interface for a print monitoring system, comprising:
    a first data area for inputting a position on an X-axis of a first portion of a printed document to be analyzed;
    a second data area for inputting a height along said X-axis of first portion of said printed document to be analyzed;
    a third data area for inputting a position on a Y-axis, perpendicular to said X-axis, of said first portion of said printed document to be analyzed;
    a fourth data area for inputting a width along said Y-axis of a portion of said first portion of said printed document to be analyzed.

11. The user interface of claim 10, further comprising:
    a user interface element identifying a decoding field, said decoding field signifying said first portion of said printed document to be analyzed;
    a representation of a second portion of said printed document neighboring said first portion, such that said first portion and said second portion are displayed in said user interface.

12. The user interface of claim 11, further comprising a data display area for displaying a result of an analysis of said first portion of said printed document.

13. The user interface of claim 11, further comprising a contrast control for adjusting a contrast parameter of an analysis of said first portion of said printed document.

14. The user interface of claim 11, further comprising a delay control for defining a delay after receipt of a trigger signal representing a start of image capture of said printed document.

* * * * *